（12） United States Patent
Takeuchi (10) Patent No.: US 7,836,691 B2
(45) Date of Patent: Nov. 23, 2010

(54) HEAT ENGINE

(75) Inventor: Makoto Takeuchi, Tokyo (JP)

(73) Assignee: Suction Gas Engine Mfg. Co., Ltd., Tokyo (JP)

( * ) Notice: Subject to any disclaimer, the term of this patent is extended or adjusted under 35 U.S.C. 154(b) by 236 days.

(21) Appl. No.: 11/665,834

(22) PCT Filed: Oct. 21, 2005

(86) PCT No.: PCT/JP2005/019397

§ 371 (c)(1),
(2), (4) Date: Apr. 20, 2007

(87) PCT Pub. No.: WO2006/043665

PCT Pub. Date: Apr. 27, 2006

(65) Prior Publication Data

US 2009/0056329 A1  Mar. 5, 2009

(30) Foreign Application Priority Data

Oct. 21, 2004  (JP) ............................. 2004-306998

(51) Int. Cl.
*F01B 29/10* (2006.01)
*F02G 1/04* (2006.01)
(52) U.S. Cl. ............................. 60/517; 60/525; 60/526
(58) Field of Classification Search ........... 60/516–526; 92/31, 33, 72–74; 62/6, 520
See application file for complete search history.

(56) References Cited

U.S. PATENT DOCUMENTS

| 2,664,698 | A | * | 1/1954 | Geeven et al. | ................. 60/524 |
| 3,115,014 | A | * | 12/1963 | Hogan | ............................... 62/6 |
| 3,845,624 | A | * | 11/1974 | Roos | ............................. 60/517 |
| 4,490,974 | A | * | 1/1985 | Colgate | ......................... 60/520 |
| 5,335,506 | A | * | 8/1994 | Byoung-Moo | .................... 62/6 |
| 5,406,801 | A | * | 4/1995 | Inoue et al. | ........................ 62/6 |

FOREIGN PATENT DOCUMENTS

| JP | 02-294540 | 12/1990 |
| JP | 10-318042 | 12/1998 |
| JP | 11-247714 A | 9/1999 |
| JP | 2003-232261 | 8/2003 |

\* cited by examiner

*Primary Examiner*—Thomas E Denion
*Assistant Examiner*—Christopher Jetton
(74) *Attorney, Agent, or Firm*—The Hath Law Group; Jearald L. Meyer; Robert T. Burns (57) ABSTRACT

A high-temperature side power piston (37) and a low-temperature side power piston (39), respectively demarcating a high-temperature space (45) and a low-temperature space (47), brings about volumetric changes of working gases in each of the high-temperature space (45) and the low-temperature space (47). At the same time, the power pistons are configured to transmit motive energy on receipt of pressure changes of working gases. A displacer (203) movably housed in a displacer cylinder (201) transfers the working gases between the high-temperature space (45) and the low-temperature space (47) without causing a pressure difference.

13 Claims, 8 Drawing Sheets

HEAT ENGINE

TECHNICAL FIELD

The present invention relates to a heat engine, for example, a Stirling Cycle, in which spaces that retain working gases with different temperature ranges from each other is provided, and a regenerator is provided as a boundary between the temperature ranges. In such a heat engine, heat and motive energy are exchanged by using volumetric change of a high-temperature space and of a low-temperature space, which are located on either side of the regenerator, and by using transfers of working gas between the spaces.

BACKGROUND ART

The Stirling Cycle is characterized by its capability of running on not only a combustion heat source but also on other heat sources with various temperature differences, such as waste heat and solar heat. Obtaining maximum output from heat sources with various temperature ranges requires an optimization of balance between the volumetric change of working gas and the gas flow passing through the regenerator in accordance with the temperature difference.

Specifically, use of a heat source with a smaller temperature difference, such as waste heat and solar heat, needs a larger ratio of gas flow passing through the regenerator to the volumetric change. The reason is as follows. The source of output of the Stirling Cycle in this case is the rise in gas pressure at the time when the gas passes through the regenerator. A smaller temperature difference renders a smaller rise in pressure relative to the gas flow passing therethrough. Accordingly, obtaining a maximum output from a heat source with a smaller temperature difference needs an increase in gas flow passing through the regenerator relative to the volumetric change in comparison to the gas flow in a case of using a heat source with a larger temperature difference.

Incidentally, there exist roughly three types of conventional configuration substantiating the Stirling Cycle: an α-configuration, a β-configuration and a γ-configuration. The α-configuration has a power piston in the high-temperature space and another power piston in the low-temperature space, so that the configuration of this kind is also called a two-piston configuration. With this configuration, each of the two pistons in each space sweeps the gas out completely. The extremely small clearance volume thus accomplished is a characteristic of this configuration.

The above-mentioned ratio can be changed by changing the phase difference between the displacement of one of the two piston and that of the other. In a case of a heat source with a smaller temperature difference, the optimization is possible by increasing the phase difference in accordance with the temperature difference. For example, though a 90° phase difference renders an optimum result for a large temperature difference of 500° C. or larger, the phase difference is increased to approximately 150° for a smaller temperature difference around 100° C. (see Patent Document: Japanese Patent No. 3134115).

DISCLOSURE OF THE INVENTION

Increasing the phase difference in the α-configuration, however, makes the relative displacement between the two pistons smaller. Accordingly, to obtain a predetermined amount of volumetric change requires a larger piston diameter. The larger piston diameter may possibly lead to an excessive piston force, and eventually to such problems as a decrease in durability and an increase in mechanical loss.

The characteristics of the β-configuration are as follows. The β-configuration has a power piston on the lower-temperature side, and a displacer is housed in the same cylinder that the power piston is housed in. The power piston and the displacer moves overlapping each other, and a complete scavenging is possible. In this case, the displacer and the power piston are bound to have the same bore diameter. For this reason, changing the above-mentioned ratio requires either an increase in the stroke of the displacer or a decrease in the stroke of the power piston. In each case, the piston speed and the piston power set a limit to the gas flow passing through the regenerator.

The γ-configuration has a power piston on the lower-temperature side, but a displacer is housed in a cylinder different from the cylinder in which the power piston is housed. For this reason, optimization of the above-mentioned ratio in accordance with the temperature difference is possible by making the diameter of the displacer larger and thus increasing the gas flow passing through the regenerator. However, use of a larger-diameter displacer may cause a problem. Specifically, a larger-diameter displacer increases the expansion and the shrinkage of flow passage of the communicating pipe with the heat exchanger and with the power piston. Thereby, the pressure loss is increased. Use of a broader flow passage in order to avoid the increase of the pressure loss increases the clearance volume. Accordingly, there is a certain limit in accomplishing the optimization.

Furthermore, making the heat engine more compact in size, lighter in weight, and producible at a lower cost requires a higher engine speed. For this purpose, the above-mentioned problems must be overcome. Satisfaction of such requirements as follows is necessary: the gas flow passing through the regenerator be increased; the piston force be smaller; and the clearance volume also be smaller.

The present invention has been made to solve the above-mentioned problems of the conventional technologies. To this end, an object of the present invention is to provide a heat engine that satisfies the requirements that the gas flow passing through the regenerator be increased; the piston force be smaller; and the clearance volume also be smaller.

In order to accomplish the above-mentioned object, the subject matter of a first aspect of the present invention is a heat engine comprising: a high-temperature space portion and a low-temperature space portion, each of which has a working gas with a different temperature range from each other; a regenerator provided between the high-temperature space portion and the low-temperature space portion; two power pistons configured to cause volumetric changes of the working gases in each of the high-temperature space portion and the low-temperature space portion, and transmit motive energy on receipt of pressure changes of the working gases; and a displacer configured to transfer the working gases between the high-temperature space portion and the low-temperature space portion, wherein heat and motive energy are exchanged by using the change in volume of the high-temperature space portion and the change in volume of the low-temperature space portion, the spaces being located respectively on both sides of the regenerator, as well as by using the transfer of the working gases.

According to the first aspect of the present invention, the heat engine has the following advantageous effects. Specifically, an independent displacer is provided to an α-configuration, in which a volumetric change of working gas is allowed to take place in each of the high-temperature and the low-temperature spaces, and in which each of the spaces has a power piston to transmit motive energy by receiving a pressure change in the working gas. Accordingly, though a complete scavenge is no longer accomplished, the heat engine still has some elements of the α-configuration. As a result, the clearance volume is smaller than that of the γ-configuration, and a necessary gas flow in accordance with the temperature difference can be obtained. Moreover, the piston force can be made smaller as a whole because the volumetric change is brought about by the relative movement of the two power pistons, and is shared by the two pistons.

In addition, each of the above-mentioned two power pistons may have a pressure receiving face which is placed opposite the regenerator.

According to the above-mentioned configuration, effects which are similar to the effects of the above-mentioned first aspect can be obtained.

In addition, the heat engine may include a displacer housing portion: being installed adjacent to both of the high-temperature and the low-temperature space portions; communicating with each of the high-temperature and the low-temperature space portions; and housing the displacer therein as allowing the displacer to reciprocate in the housing portion.

According to the above-mentioned configuration, effects which are similar to the effects of the above-mentioned first aspect can be obtained.

In addition, the displacer may include two pistons, each of which is configured to move with a phase difference of 180° to each other, and one of the two pistons is placed in the high-temperature space portion and the other of the two pistons is placed in the low-temperature space portion.

According to the above-mentioned configuration, effects which are similar to the effects of the above-mentioned first aspect can be obtained.

Any one of the two power pistons and any one of the two displacers may be integrated into a single unit.

According to the above-mentioned configuration, a piston can substantially be eliminated, the structure can be simplified, and a reduction in the loss due to leakage of the working gas and a reduction in mechanical loss can be accomplished.

In addition, the other of the two power pistons and the other of the two displacers may be provided so that the power piston and the displacer can be sealed from each other and move relatively to each other.

According to the above-mentioned configuration, the power piston and the displacer are configured to be sealed from each other, and to be movable relatively to each other. Thus, the sliding distance in the seal portion is made shorter, and the durability of the seal can be improved.

A plurality of heat engine units, each of which includes the displacer and the power piston, may be stacked in the arranging direction; and the displacer or the power piston between each of the heat engine units located next to each other, may be shared by each of the heat engine units located next to each other as an integrated displacer or as an integrated power piston.

According to the above-mentioned configuration, two adjacent heat engine units share a piston to simplify the structure. At the same time, in a case where the heat engine is used as an engine cycle, a necessary output can be obtained with ease by stacking an appropriate number of standardized modules. Moreover, a heat pump cycle or a refrigerator cycle may be combined as appropriate to substantiate a compound cycle corresponding to a heat source of various kinds or to an output temperature of various degrees.

In addition, a compressor may be connected to at least one of the power piston and the displacer.

According to the above-mentioned configuration, an integrated structure of a heat engine and a compressor thus accomplished can drive the compressor with fewer number of component parts than in the case where a heat engine and a compressor are provided as two different bodies. As a result, a system thus obtained can reduce the mechanical loss down to a minimum level.

In addition, at least one of the high-temperature space portion and the low-temperature space portion may include a bellows which is retractable both ways.

According to the above-mentioned configuration, the displacer is connected to at least one of the high-temperature and the low-temperature space portions with a bellows which is capable of extending and retracting upward and downward, so that a sliding portion for the displacer is unnecessary, and there is no longer cause for concern about the sealing state, either. As a result, an even more simplified structure will suffice.

In order to accomplish the above-mentioned object, the subject matter of a second aspect of the present invention is a heat engine comprising: a high-temperature space portion and a low-temperature space portion, each of which has a working gas with a different temperature range from each other; a regenerator provided between the high-temperature space portion and the low-temperature space portion; a power piston configured to cause a volumetric change of the working gas in any one of the high-temperature space portion and in the low-temperature space portion, and transmit motive energy on receipt of a pressure change of the working gas; two displacers, each of which has a larger area for receiving pressure than that of the power piston, the two displacers being placed in the respective high-temperature space portion and the low-temperature space portion, and configured to transfer the working gases between the high-temperature space portion and the low-temperature space portion; and two pistons respectively provided to the two displacers, each of which is configured to move with a 180° phase difference to each other, wherein heat and motive energy are exchanged by using the change in volume of the high-temperature space portion and the change in volume of the low-temperature space portion, one of the spaces being located on one of the sides of the regenerator and the other of the spaces being located on the other of the sides of the regenerator, as well as by using the transfer of the working gases.

According to the second aspect of the present invention, in addition to the effects in the first aspect, the heat engine has the following effects. A 180° phase can be accomplished by connecting the two displacers with each other by a piston. The two displacers are placed as being opposed to each other. In addition, even when a larger-area displacer is used, the piston can absorb the pressure change of the working gas without allowing the transmission to the shafting. As a result, the piston force of the power piston can be kept smaller, and the mechanical loss can be reduced to the minimum.

BEST MODE FOR CARRYING OUT THE INVENTION

What follows is a detailed description of a Stirling Cycle according to embodiments of the present invention. The description is given by referring to the drawings. In the following drawings, identical or similar parts are designated by the same or similar reference numerals. In the following description of embodiments, the description of a part with the same reference numeral that has been already described in the description of an earlier embodiment is sometimes omitted in the description of a later embodiment.

Figure 1:
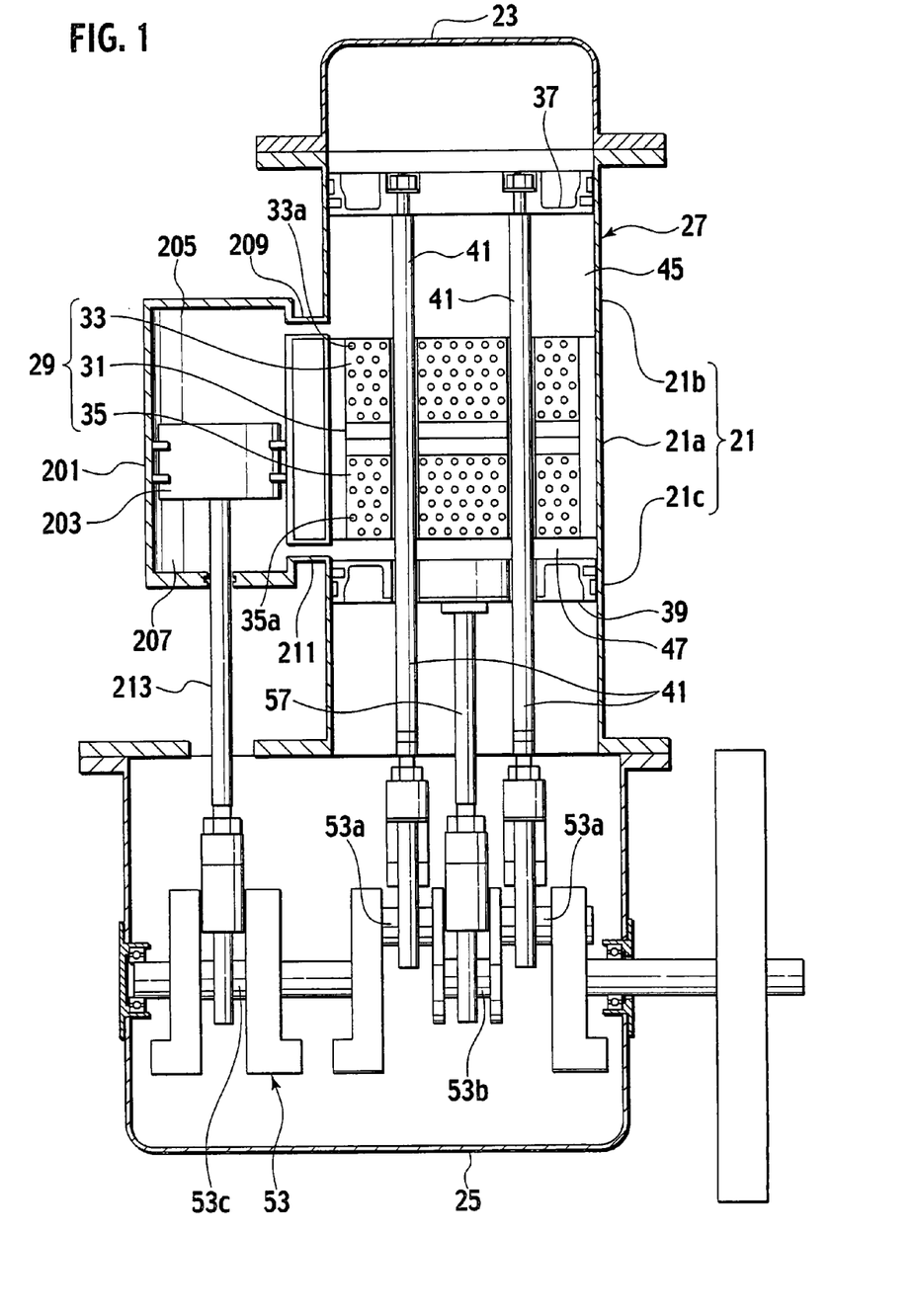
FIG. 1 is a cross-sectional view of a Stirling Cycle according to a first aspect of the present invention.

FIG. 1 is a cross-sectional view of a Sterling Cycle as a heat engine showing a first embodiment of the present invention. A housing main body 21, a cover 23 attached to an upper opening of the housing main body 21, and a crankcase 25 attached to a lower opening of the housing main body 21 constitute a housing 27. A heat-exchanger unit 29 is housed in, and fixed to a heat-exchanger housing portion 21a, which is shown approximately at the center in a vertical direction of the housing main body 21 in FIG. 1. A regenerator 31, as a boundary between temperature ranges which are different from each other, is provided to the center of the heat-exchanger unit 29, while a heat sink 33 and a radiator 35 are respectively provided above and below the regenerator 31.

The heat sink 33 includes a heat transfer pipe 33a extending in a direction, in FIG. 1, orthogonal to the paper surface on which the figure is drawn. High-temperature fluid flows in the heat transfer pipe 33a, and a plurality of fins are attached around the heat transfer pipe 33a. Likewise, the radiator 35, includes a heat transfer pipe 35a extending in a direction orthogonal to the paper surface on which the figure is drawn. Low-temperature fluid flows in the heat transfer pipe 35a, and a plurality of fins are attached around the heat transfer pipe 35a. On the other hand, the regenerator 31, is formed by stacking metal wire mesh, and the like.

A high-temperature side power piston 37 is housed, slidably in a vertical direction in FIG. 1, in a high-temperature side cylinder portion 21b of the housing main body 21 on the upper side of the heat sink 33. A low-temperature side power piston 39 is housed, slidably in a vertical direction in FIG. 1, in a low-temperature side cylinder portion 21c of the housing main body 21 on the lower side of the radiator 35.

The high-temperature side power piston 37 is connected to crankpins 53a of a crankshaft 53 with a plurality of piston rods 41, which penetrate the heat-exchanger unit 29 and the low-temperature side power piston 39, and which are movable relatively to the heat-exchanger unit 29 and the low-temperature side power piston 39. Meanwhile, the low-temperature side power piston 39 is connected to a crankpin 53b of the crankshaft 53.

The high-temperature side power piston 37 and the low-temperature side power piston 39, such as ones described above, are connected to the crankshaft 53 so that the pistons 37 and 39 can move relatively to each other with a 90° phase difference.

Each of the high-temperature side power piston 37 and the low-temperature side power piston 39 causes a volumetric change of the working gas respectively in a high-temperature space 45 and in a low-temperature space 47, which will be described later. Each of the high-temperature side power piston 37 and the low-temperature side power piston 39 constitutes a power piston that transmits motive energy by receiving a pressure change in the working gas.

The regions surrounded by the housing main body 21, and each of the power pistons 37 and 39 are working-gas spaces in each of which a working gas, such as a Helium gas, is filled, and each of which is sealed.

The high-temperature space 45 is formed between the heat sink 33 and the high-temperature side power piston 37. The working gas heated by the heat sink 33 is expanded in the high-temperature space 45. The low-temperature space 47 is formed between the radiator 35 and the low-temperature side power piston 39. The working gas that has lost its heat at the radiator 35 is compressed in the low-temperature space 47. Heat and motive energy are exchanged by transferring the working gas between the high-temperature space 45 and the low-temperature space 47, and then by repeating expansion and compression of the working gas.

A displacer cylinder 201 is installed so as to be adjacent to the housing main body 21. A displacer 203 is movably housed in the displacer cylinder 201. A space 205 exists above the displacer 203, and is communicated with the high-temperature space 45 via a communication pipe 209. Meanwhile, a space 207 exists below the displacer 203, and communicates with the low-temperature space 47 via a communication pipe 211.

The displacer 203 is connected with a crankpin 53c of the crankshaft 53 with a connecting rod 213. The displacer 203 such as this one moves the working gas between the high-temperature space 45 and the low-temperature space 47 without causing any pressure difference.

When the reciprocating movement of each of the power pistons 37 and 39, which is produced by changes in pressure of the working gas, is taken out as the rotating movement of the crankshaft 53, the Sterling Cycle becomes an engine. In contrast, when the crankshaft 53 is made to rotate by external driving means, such as a motor, and thus when the power pistons 37 and 39 are made to move reciprocally, the Sterling Cycle becomes a heat pump or a refrigerator. When the Sterling Cycle is used as a heat pump, the Sterling Cycle supplies a high-temperature heat to the outside via heat transfer fluid that flows in the heat transfer pipe 33a penetrating the heat sink 33. When the Sterling Cycle is used as a refrigerator, the Sterling Cycle supplies a low-temperature heat to the outside via heat transfer fluid that flows in the heat transfer pipe 35a penetrating the radiator 35.

In the Sterling Cycle according to the first embodiment, the independent displacer 203 is provided to a Sterling Cycle of the α-configuration. In the Sterling Cycle of α-configuration, a volumetric change of working gas is allowed to take place in each of the high-temperature and the low-temperature spaces. Each of above spaces has a power piston, the high-temperature side power piston 37 and the low-temperature side power piston 39, respectively, to transmit motive energy by receiving a pressure change in the working gas. Accordingly, though a complete scavenge is no longer accomplished, the Sterling Cycle still has some elements of α-configuration. As a result, the clearance volume of this Stirling Cycle is smaller than that of the γ-configuration. In addition, an enough amount of gas flow to obtain a necessary amount of heat exchange in accordance with the temperature difference can be obtained. Furthermore, the piston force can be made smaller as a whole because the volumetric change is brought about by the relative movement of the high-temperature power piston 37 and of the low-temperature power piston 39, and is shared by the two power pistons 37 and 39.

Figure 2:
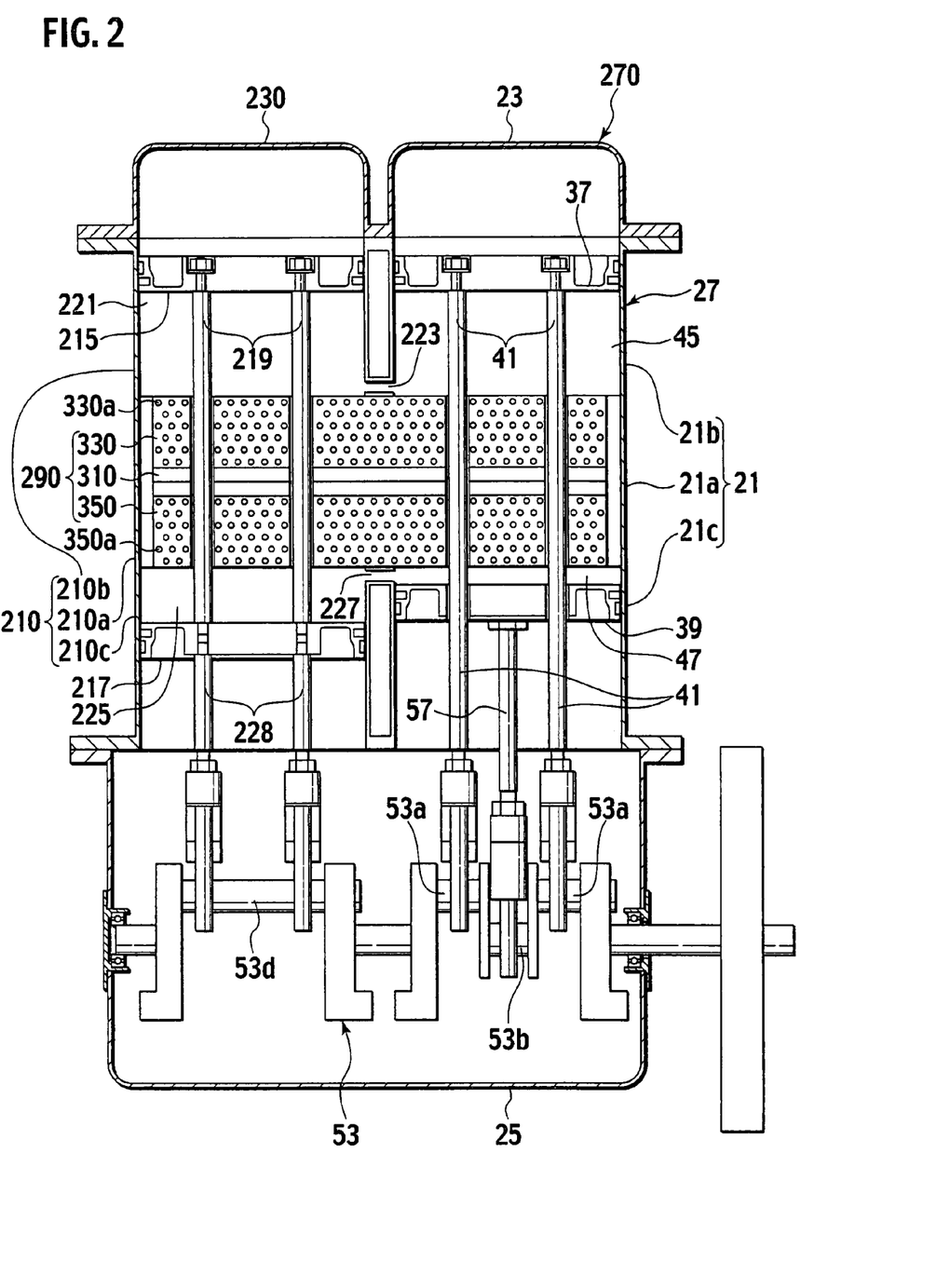
FIG. 2 is a cross-sectional view of a Stirling Cycle according to a second aspect of the present invention.

FIG. 2 is a cross-sectional view of a Sterling Cycle as a heat engine according to a second embodiment of the present invention. In the second embodiment, a second housing main body 210 integrated with a housing main body 21, the same as one shown in FIG. 1, is provided. A second cover 230 integrated with a cover 23, the same as one shown in FIG. 1, is also provided. A heat-exchanger unit 290 is housed in, and fixed to a heat-exchanger housing portion 210a, which is shown approximately at the center in a vertical direction in the figure of the second housing main body 210. The heat-exchanger unit 290 is placed across the heat-exchanger units 21a and 210a. A regenerator 310 is provided at the center of the heat-exchanger unit 290, while a heat sink 330 and a radiator 350 are respectively provided above and below the regenerator 310.

The heat sink 330 includes a heat transfer pipe 330a extending in a direction, in the figure, orthogonal to the paper surface on which the figure is drawn. High-temperature fluid flows in the heat transfer pipe 330a, and a plurality of fins are attached around the heat transfer pipe 330a. Likewise, the radiator 350 includes a heat transfer pipe 350a extending in a direction orthogonal to the paper surface on which the figure is drawn. Low-temperature fluid flows in the heat transfer pipe 350a, and a plurality of fins are attached around the heat transfer pipe 350a. On the other hand, the regenerator 310 is formed by stacking metal wire mesh, and the like.

A first displacer 215 is housed, slidably in a vertical direction in the figure, in a high-temperature side cylinder portion 210b of the second housing main body 210. A second displacer 217 is housed, slidably in a vertical direction in the figure, in a low-temperature side cylinder portion 210c of the second housing main body 210.

A housing 270 includes the housing main body 21 and the second housing main body 210. Each of high-temperature cylinder portions 21b and 210b, respectively of the housing main body 21 and the second housing main body 210, has a cylindrical shape. Each of low-temperature cylinder portions 21c and 210c, respectively of the housing main body 21 and the second housing main body 210, also has a cylindrical shape. The heat exchanger unit 290 is housed in, and throughout heat-exchanger housing portions 21a and 210a. To this end, the heat-exchanger housing portions 21a and 210a combined has a substantial square shape in a plan view.

The first and the second displacers 215 and 217 are connected to each other by a plurality of rods 219 which penetrate the heat-exchanger unit 290, and which are capable of moving relatively to the heat-exchanger unit 290. Thus, the first and the second displacers 215 and 217 reciprocally travel together as a unit. In this way, two pistons that move with a 180° phase difference from each other constitute the first and the second displacer 215 and 217.

A space 221, located between the first displacer 215 and the heat-exchanger unit 290, communicates with a high-temperature space 45, while a space 225, located between the second displacer 217 and the heat-exchanger unit 290, communicates with a low-temperature space 47. As a result, each of the spaces 221 and 225 is a part respectively of the high-temperature space 45 and the low-temperature space 47. This may be regarded as that the first and the second displacers 215 and 217 are placed in the high-temperature space 45 and the low-temperature space 47, respectively.

The second displacer 217 is connected to a crankpin 53d of a crankshaft 53 by a plurality of rods 228.

In the Stirling Cycle according to the second embodiment mentioned above, the two pistons that move with a 180° phase difference from each other constitute the first and the second displacer 215 and 217, and the first and the second displacers 215 and 217 are placed in the high-temperature space 45 and the low-temperature space 47, respectively. As a result, in addition to the effects in the first embodiment, the Stirling Cycle in the second embodiment can further reduce the clearance volume, and can make the pressure loss even smaller.

Since the first and the second displacers 215 and 217 placed as being opposed to each other, a 180° phase can be accomplished by connecting the two displacers 215 and 217 to each other by the rods 219. Moreover, even when a larger-area displacer is used, the rods 219 can absorb the pressure change of the working gas without allowing the transmission to the shafting (the crankshaft 53). As a result, the piston force can be kept smaller. Thus, the mechanical loss can be reduced to the minimum.

Note that, in the second embodiment, any one of the first and the second displacers 215 and 217, for example, the first displacer 215, may be integrated with any one of high-temperature side and the low temperature side power pistons 37 and 39, for example, the high-temperature side power piston 37. In this case, the housing 270 has a shape of a single continuous cylinder, which includes high-temperature side cylinder portion 21b and 210b as well as the heat-exchanger housing portion 21a and 210a, where the first displacer 215 and the high-temperature side power piston 37, which are integrated with each other, are housed.

In this configuration, a piston can substantially be eliminated from the configuration shown in FIG. 2, the structure can be simplified, and the loss due to leakage of the working gas and the mechanical loss can be reduced.

Figure 3:
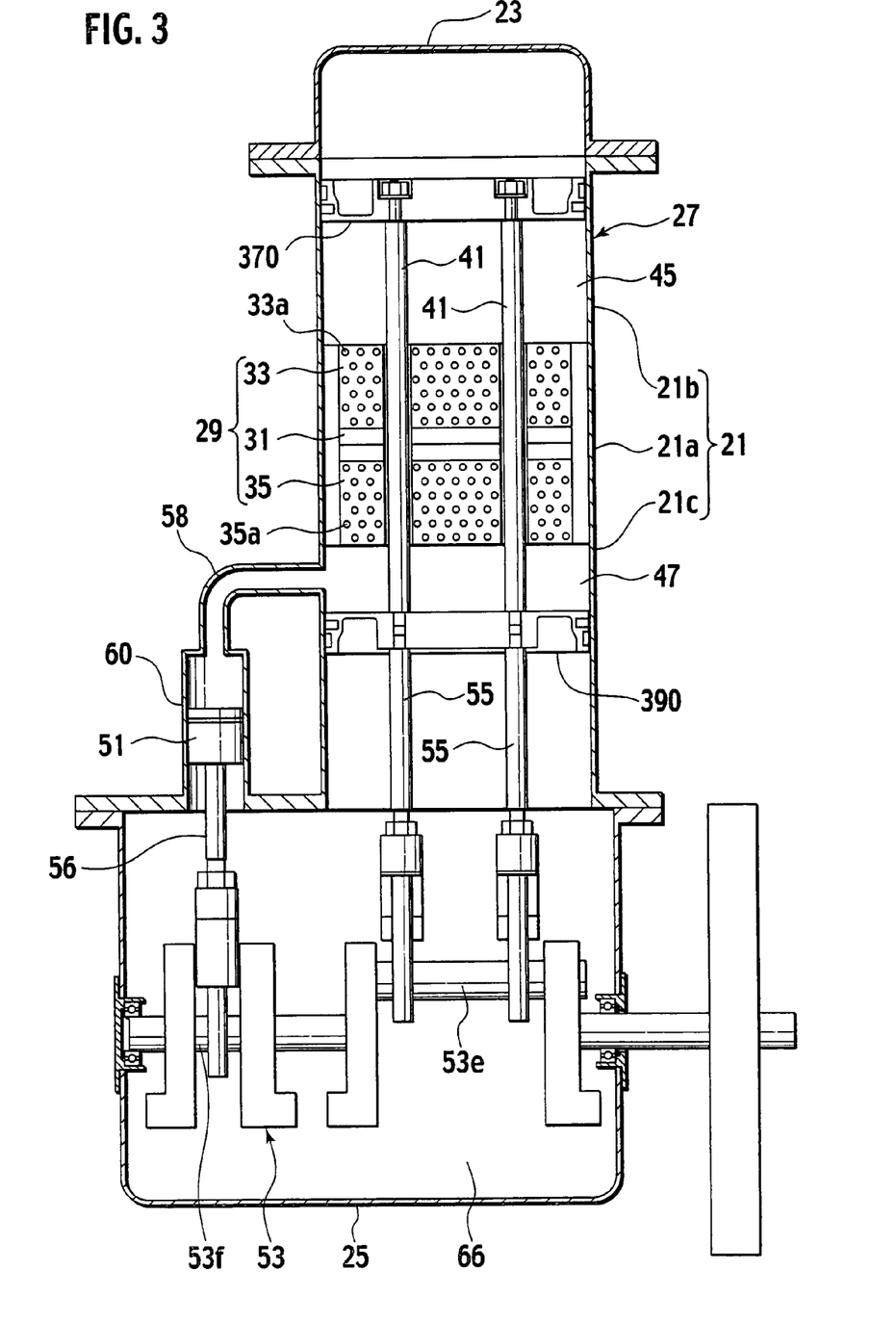
FIG. 3 is a cross-sectional view of a Stirling Cycle according to a third aspect of the present invention.

FIG. 3 is a cross-sectional view of a Sterling Cycle as a heat engine according to a third embodiment of the present invention. In the third embodiment, as in the first embodiment shown in FIG. 1, a housing main body 21, a cover 23 attached to an upper opening of the housing main body 21, and a crankcase 25 attached to a lower opening of the housing main body 21 constitute a housing 27. A heat-exchanger unit 29 is housed in, and fixed to a heat-exchanger housing portion 21a, which is shown approximately at the center in a vertical direction in the figure of the housing main body 21. A regenerator 31 is provided at the center of the heat-exchanger unit 29, while a heat sink 33 and a radiator 35 are respectively provided above and below the regenerator 31.

The heat sink 33 includes a heat transfer pipe 33a extending in a direction, in the figure, orthogonal to the paper surface on which the figure is drawn. High-temperature fluid flows in the heat transfer pipe 33a, and a plurality of fins are attached around the heat transfer pipe 33a. Likewise, the radiator 35 includes a heat transfer pipe 35a extending in a direction orthogonal to the paper surface on which the figure is drawn. Low-temperature fluid flows in the heat transfer pipe 35a, and a plurality of fins are attached around the heat transfer pipe 35a. On the other hand, the regenerator 31 is formed by stacking metal wire mesh, and the like.

A first displacer 370 is housed, slidably in a vertical direction in the figure, in a high-temperature side cylinder portion 21b of the housing main body 21 on the upper side of the heat sink 33. A second displacer 390 is housed, slidably in a vertical direction in the figure, in a low-temperature side cylinder portion 21c of the housing main body 21 on the lower side of the radiator 35. The first displacer 370 and the second displacer 390 are linked to each other by a plurality of piston rods 41, which penetrate the heat-exchange unit 29. The two displacers 370 and 390 together move reciprocally as a single body. Accordingly, two pistons that move with a 180° phase difference from each other constitute the first displacer 370 and the second displacer 390.

The regions surrounded by the housing main body 21, and each of the displacers 370 and 390 are working-gas spaces in each of which a working gas, such as a Helium gas, is filled, and each of which is sealed.

A high-temperature space 45 is formed between the heat sink 33 and the first displacer 370. The working gas heated by the heat sink 33 is expanded in the high-temperature space 45. A low-temperature space 47 is formed between the radiator 35 and the second displacer 390. The working gas that has lost its heat at the radiator 35 is compressed in the low-temperature space 47. Heat and motive energy are exchanged by transferring the working gas between the high-temperature space 45 and the low-temperature space 47, and then by repeating expansion and compression of the working gas.

The second displacer 390 is connected to a crankpin 53e of a crankshaft 53, which is rotatably supported in the crankcase 25 by a plurality of piston rods 55.

In addition, a cylinder portion 60, which communicates with the outside via a communication passage 58, is provided to the low-temperature space 47. A power piston 51 is housed in the cylinder portion 60. The power piston 51 is connected to a crankpin 53f of the crankshaft 53 by a connecting rod 56. Here, the power piston 51 is connected to the crankshaft 53 so as to be capable of moving relatively to the second displacer 390 with a 90° phase difference. Moreover, each of the first and the second displacers 370 and 390 has a larger area for receiving pressure than that of the power piston 51.

Furthermore, the crankcase 25 is formed so as to cover the back portion of the power piston 51 and the back portion of the second displacer 390, and thus a buffer space 66 is formed. The buffer space 66 is provided to make the pressure in the working gas space higher than the atmospheric pressure. The pressure difference between the pressure within the working gas space and the pressure within the buffer space acts on the power piston 51. As a result, the load that the power piston 51 receives is reduced.

In the Stirling Cycle according to the third embodiment, when the first displacer 370 and the second displacer 390 reciprocally travel with a 180° phase difference, the power piston 51 reciprocally travels to change the volume of the working gas space. As a result, the above operation of the first displacer 370 and the second displacer 390 is made substantially equivalent to an operation with a phase difference other than that of 180°. The volumetric change of the working gas space brings about the expansion and compression of the working gas, by which heat and motive energy are exchanged. Specifically, the working gas consecutively passes through the heat sink 33, then regenerator 31 and then the radiator 35 as a reciprocating flow. At this time, the working gas is subjected to a heat exchange in the heat sink 33 and in the radiator 35, and the working gas transfers through the regenerator 31.

Accordingly, suppose that the first displacer 370 and the second displacer 390 are operated substantially with a phase difference other than that of 180°, for example, with an approximately 150° phase difference. In this case, since the stroke volume of the power piston 51 is smaller than that of each of the displacers 370 and 390, the phase difference between the volumetric change of the high-temperature space and that of the low-temperature space can be made substantially large. For this reason, the power piston 51 may be connected to the crankshaft 53 so that the power piston 51 and the first displacer 370 may have a 90° phase difference. As a result, the setting of the crankshaft 53 is easy, and the crankshaft can be fabricated with ease even for a small-temperature-difference type Sterling Cycle as in the case of a crankshaft for a high-temperature-difference type Sterling Cycle.

Additionally, in this case, even when the heat-exchanger unit 29 is made to be thinner, and to have a larger surface area, that is, the heat-exchanger unit 29 is made to be more compact, a high-speed revolution is achieved easily. Since the first displacer 370 and the second displacer 390 are configured to have a 180° phase difference from each other, that is, the displacers 370 and 390 travel together as a single unit, the working gas transfers between the high-temperature space 45 and the low-temperature space 47 with certainty. In addition, the resistance of flow passage and the pressure loss are reduced. Thus, a high-speed revolution is achieved easily. Since the high-speed revolution is achieved, and the Stirling Cycle is made to be compact, the Stirling Cycle is optimized for a low-temperature-difference type Stirling engine, which can effectively utilize a natural energy, such as geothermal heat, as well as industrial waste heat.

The first displacer 370 is connected to the second displacer 390 by the plurality of piston rods 41, and the second displacer 390 is connected to the crankshaft 53. Accordingly, even when each of the displacers 370 and 390 is made to have a larger surface area as the heat-exchanger unit 29 is made thinner, only a small load acts on the crankshaft 53. As a result, the crankshaft only needs a less strength than otherwise, and the mechanical loss can be reduced as well.

In the Stirling Cycle according to the third embodiment, in addition to the effects in the first embodiment, the following effects can be obtained. Since the two displacers, that is, the first and the second displacers 370 and 390, are placed as being opposed to each other, a 180° phase can be accomplished by connecting the two displacers 370 and 390 to each other by the piston rods 41. In addition, even when displacers each with a large surface area are used, the pressure change of working gas can be absorbed with the piston rods 41 without transmitting the pressure change to the shafting (the crankshaft 53). Furthermore, the piston force of the power piston 51 can be kept small. As a result, the mechanical loss can be lowered to a minimum level.

Figure 4:
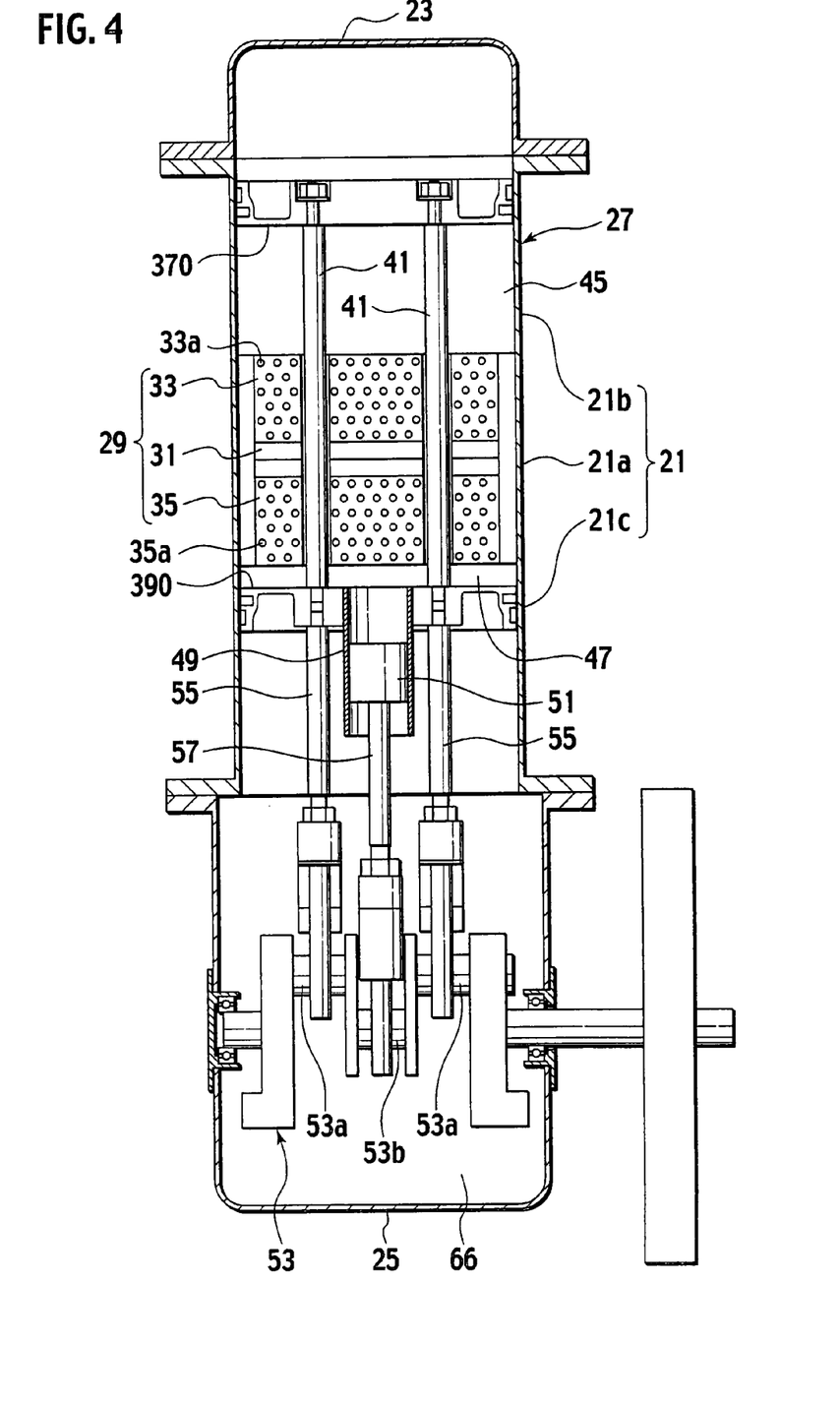
FIG. 4 is a cross-sectional view of a Stirling Cycle according to a fourth aspect of the present invention.

FIG. 4 is a cross-sectional view of a Sterling Cycle according to a fourth embodiment of the present invention. In the fourth embodiment, a cylinder portion 49, which communicates with a low-temperature space 47, is formed in a center portion of a second displacer 390. A power piston 51, which is the same as that of the third embodiment shown in FIG. 3, is housed as is capable of moving up and down, in the cylinder portion 49.

In other words, in the fourth embodiment, the power piston 51 and the second displacer 390 are configured to be capable of moving relatively to each other while being sealed from each other.

On the other hand, the second displacer 390 is connected, by a plurality of piston rods 55, to crankpins 53a of a crankshaft 53, which is supported in a crankcase 25. In addition, the power piston 51 is connected to a crankpin 53b by a piston rod 57. Here, the power piston 51 is connected to the crankshaft 53 so as to be capable of moving relatively to the second displacer 390 with a 90° phase difference.

In the Stirling Cycle according to the fourth embodiment, in addition to the effects in the third embodiment, the following effect can be obtained. Since the power piston 51 and the second displacer 390 are configured to be capable of moving relatively to each other while being sealed from each other, the sliding distance in the seal portion can be made shorter than otherwise, and the durability of the seal is improved.

In addition, by forming the cylinder portion 49 in the second displacer 390, the utilization of space can be made more effective, and the apparatus as a whole can be made more compact than otherwise.

Figure 5:
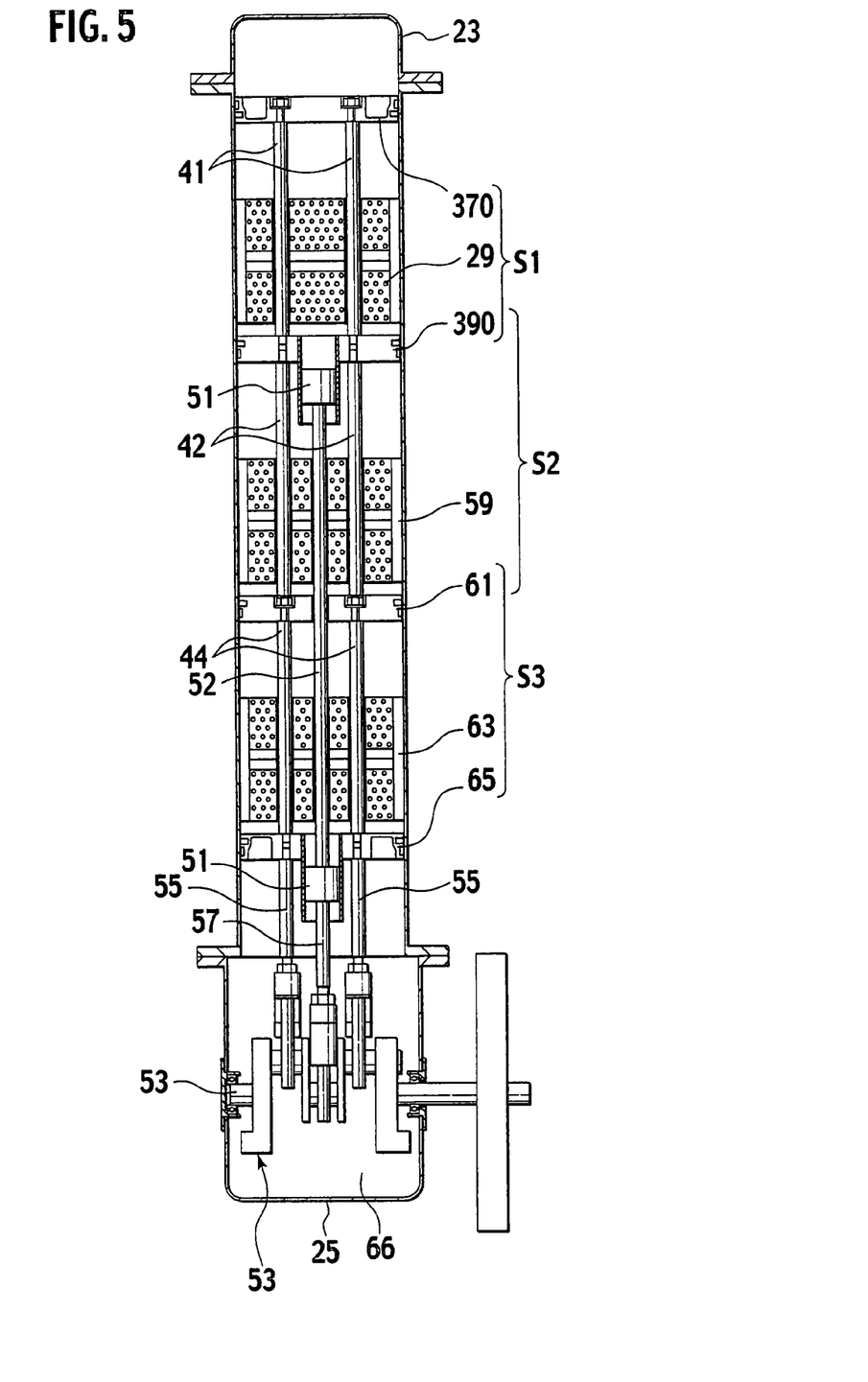
FIG. 5 is a cross-sectional view of a Stirling Cycle according to a fifth aspect of the present invention.

FIG. 5 is a simplified cross-sectional view of a Sterling Cycle as a heat engine according to a fifth embodiment of the present invention. In the fifth embodiment, below the second displacer 390 of the same configuration as that shown in FIG. 4, in which a first displacer 370 at the top in the figure, a heat-exchanger unit 29 and a second displacer 390, are sequentially arranged, the following configuration is arranged. Specifically, a second heat-exchanger unit 59, a third piston 61, a third heat-exchanger unit 63 and a fourth piston 65 are sequentially arranged.

The first displacer 370 is connected to the second displacer 390 by a plurality of piston rods 41, as in the case of those in FIG. 4. In addition, the second displacer 390 is connected to the third piston 61 by a plurality of rods 42 penetrating the second heat-exchanger unit 59. The third piston 61 is connected to the fourth piston 65 by a plurality of rods 44 penetrating the third heat-exchanger unit 63. The fourth piston 65 is connected to a crankshaft 53 by piston rods 55. As a result, the first displacer 370, the second displacer 390, the third piston 61 and the fourth piston 65 operate as a single unit, with a 180° phase difference between two adjacent pistons.

A power piston 51 provided to the second displacer 390 is connected to another power piston 51 provided in the fourth piston 65, by a rod 52 penetrating the second heat-exchanger unit 59, the third piston 61 and the third heat-exchanger unit 63. The power piston 51 provided to the fourth piston 65 is connected to the crankshaft 53 by a piston rod 57. Each of the power pistons 51 operates with a 90° phase difference from the first displacer 370, the second displacer 390, the third piston 61 and the fourth piston 65.

In this case, suppose that the first displacer 370, the heat exchanger unit 29 and the second displacer 390 constitute a cycle unit S1, then the second displacer 390, the second heat-exchanger unit 59 and the third piston 61 constitute a cycle unit S2 which is adjacent to the cycle unit S1. The cycle unit S1 and the cycle unit S2 share the second displacer 390. In addition, the third piston 61, the third heat-exchanger unit 63 and the fourth piston 65 constitute a cycle unit S3 which is adjacent to the cycle unit S2. The cycle unit S2 and the cycle unit S3 share the third piston 61.

The cycle units S1, S2 and S3 constitute a heat-engine unit.

In a case where this cycle is used as an engine cycle while simplification of structure is pursued by a shared use of a piston by two adjacent cycle units as is shown above, a necessary output can be obtained with ease by stacking standardized modules as appropriate. Furthermore, a combined cycle can be substantiated in accordance with various heat sources and with various output temperatures by combining a heat pump cycle or a refrigerating cycle as appropriate.

Note that three cycle units S1, S2 and S3 are employed in the example shown in FIG. 5. Meanwhile, the number of cycle units may be further increased to four, five, and so on.

Figure 6:
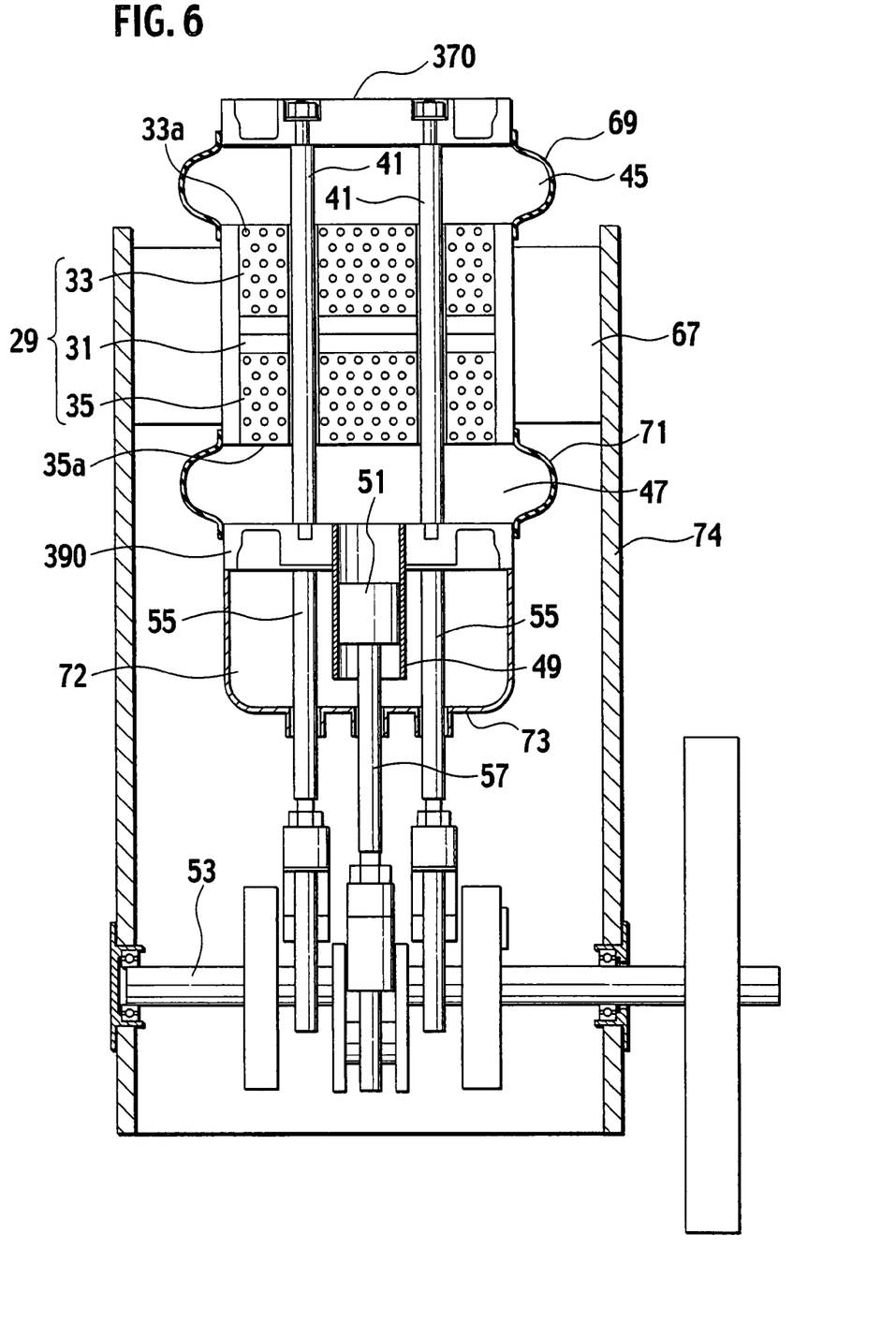
FIG. 6 is a cross-sectional view of a Stirling Cycle according to a sixth aspect of the present invention.

FIG. 6 is a cross-sectional view of a Sterling Cycle according to a sixth embodiment of the present invention. In the sixth embodiment, a heat-exchanger unit 29 composed of a regenerator 31, a heat sink 33 and a radiator 35, is housed in a heat-exchanger body 67. In addition, the rim at the lower opening portion of a bellows 69 is attached to the rim at the upper opening portion of the heat-exchanger body 67, while the upper opening portion of a bellows 71 is attached to the lower opening portion of the heat-exchanger body 67.

Moreover, the rim of the upper opening of the bellows 69 is attached to the rim of the outer circumference of a first displacer 370, while the rim of the lower opening of the bellows 71 is attached to the rim of the outer circumference of a second displacer 390. An undercover 73, which forms a buffer space 72, is attached to the bottom of a second displacer 390. Piston rods 55 and a piston rod 57 penetrate the undercover 73, while the buffer space 72 is kept sealed.

Furthermore, the upper inner circumferential portion of a cylindrical supporting housing 74 is fixed to the outer circumference of the heat-exchanger body 67, while a crankshaft 53 is rotatably supported at the bottom of the supporting housing 74.

Also in this example, the first displacer 370 is connected to the second displacer 390 by piston rods 41. Accordingly, the displacers 370 and 390, combined to be a single unit, reciprocally travel with a 180° phase difference. In addition, a power piston 51 moves relatively to the second displacer 390 with a 90° phase difference, and thereby bringing about a volumetric change in a working gas space. As a result, the displacers 370 and 390 reciprocally travel substantially with a phase difference other than that of 180°.

Moreover, in this case, the heat-exchanger body 67 is connected to each of the displacers 370 and 390 by the respective bellows 69 and 71, both of which are vertically extensible. As a result, sliding portions for the respective displacers 370 and 390 are no longer necessary, and there is no longer cause for concern about the sealing state. Hence, an even more simplified structure will suffice.

Figure 7:
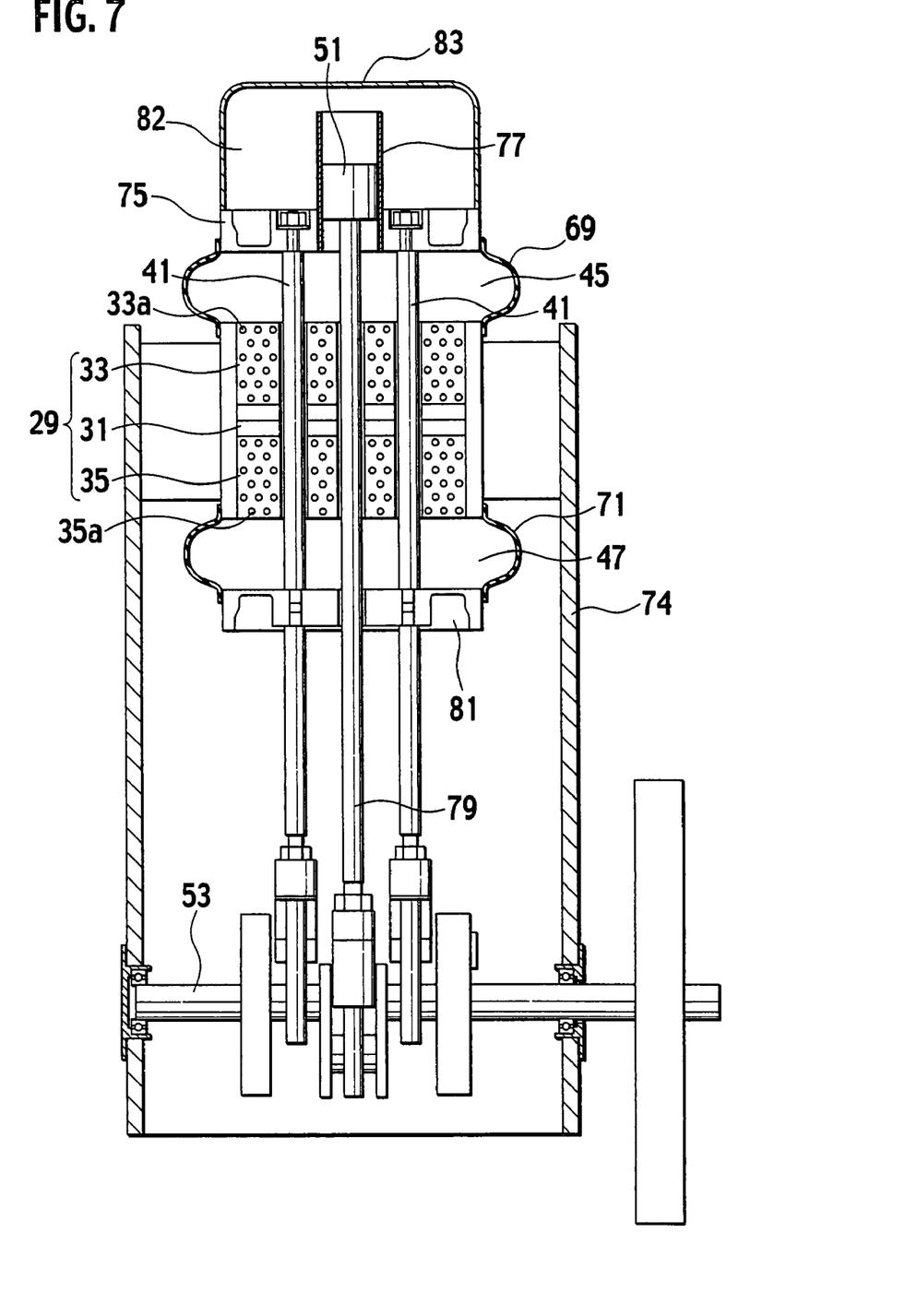
FIG. 7 is a cross-sectional view of a Stirling Cycle according to a seventh aspect of the present invention.

FIG. 7 is a cross-sectional view of a Sterling Cycle according to a seventh embodiment of the present invention. In the seventh embodiment, a power piston 51 is installed in a cylinder portion 77, which is provided to a first displacer 75. A first end of a connecting rod is connected to the power piston 51, and a second end thereof is connected to a crankshaft 53 while the connecting rod 79 penetrates a heat-exchanger unit 29 and a second displacer 81. In addition, an upper cover 83 is attached to, and seals the first displacer 75, and thereby forming a buffer space 82.

Also in this example, the first displacer 75 is connected to the second displacer 81 by piston rods 41. Accordingly, the displacers 75 and 81, combined to be a single unit, reciprocally travel with a 180° phase difference. In addition, the power piston 51 moves relatively to the first displacer 75 with a 90° phase difference, and thereby bringing about a volumetric change in a working gas space. As a result, each of a high-temperature space 45 and a low-temperature space 47 changes in volume substantially with a phase difference other than that of 180°.

Note that, also in the fourth embodiment shown in FIG. 4, as in the example shown in FIG. 7, the power piston 51 may be provided to the first displacer 370. Additionally, in any one of the fourth embodiment shown in FIG. 4, the sixth embodiment shown in FIG. 6, and the seventh embodiment shown in FIG. 7, two power pistons 51 may be provided to both of the first displacer 370 or 75, and the second displacer 390 or 81. In such a case, a linking rod penetrating the heat-exchanger unit 29, is provided to connect the two power pistons 51 to each other. In other words, the two power pistons 51 reciprocally travel in synchronization.

Moreover, in the third embodiment shown in FIG. 3, instead of providing the power piston 51 to the low-temperature space 47 side, a cylinder portion may be provided in the high-temperature space 45 via a communicating passage, and then a power piston 51 may be housed in this cylinder portion. Alternatively, a power piston 51 may be provided to each of the low-temperature space 47 side and the high-temperature space 45 side.

Furthermore, in the fifth embodiment shown in FIG. 5, instead of providing each of the power pistons 51 in each of the second displacer 390 and the fourth piston 65, a power piston 51 may be provided to each of the first displacer 370 and the third piston 61. Still furthermore, a power piston 51 may be provided to each of all of the displacers 370 and 390, as well as the pistons 61 and 65.

Figure 8:
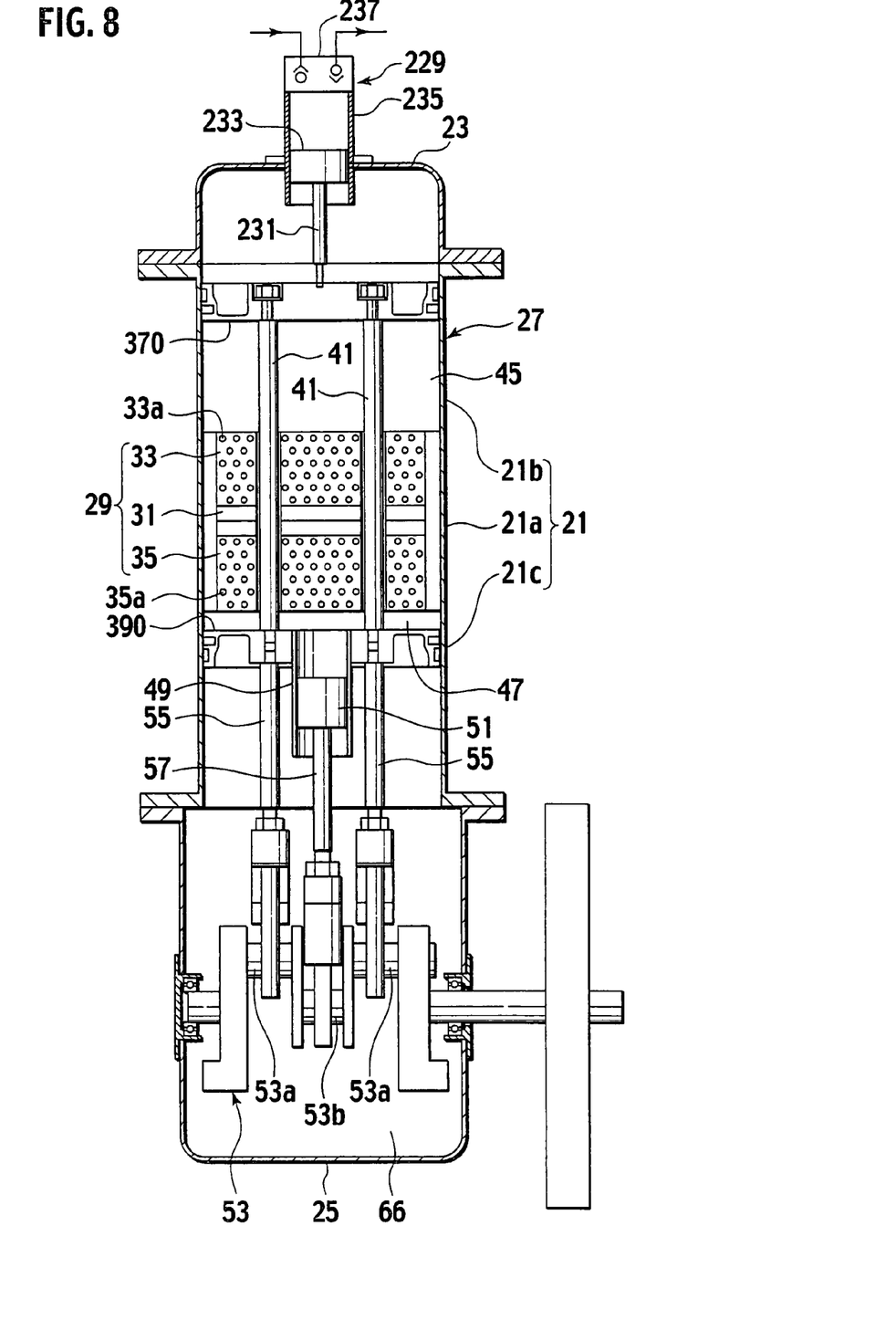
FIG. 8 is a cross-sectional view of a Stirling Cycle according to an eighth aspect of the present invention.

FIG. 8 shows an eighth embodiment. In the eighth embodiment, a compressor 229 is additionally connected to a first displacer 370, in the configuration of the fourth embodiment shown in FIG. 4. Specifically, a piston 233 is connected to the first displacer 370 by a piston rod 231, and the piston 233 is movably housed in a cylinder portion for compressor 235. The cylinder portion for compressor 235 is fixed to a cover 23. In FIG. 8, a valve mechanism 237 is provided to the top of the cylinder portion for compressor 235 so that the cylinder portion for compressor 235 functions as a compressor with the reciprocal travel of the piston 233 caused by the movement of the first displacer 370.

As is shown above, in the eighth embodiment shown in FIG. 8, the Sterling Cycle as a heat engine and the compressor 229 are integrated into a single structure. With this configuration, the compressor can be driven with a fewer component parts than with a configuration in which the heat engine and the compressor are provided as two separate bodies. As a result, a system with as little mechanical loss as possible can be obtained.

Though the present invention has been described by the embodiments thus far, the present invention is not limited to these embodiments. Configuration of each part can be replaced with any configuration by a similar function.

INDUSTRIAL APPLICABILITY

A heat engine can be provided while such requirements as increasing the gas flow passing through the regenerator, decreasing the piston force, and decreasing the clearance volume as well, are satisfied by using the heat engine.

The invention claimed is:

1. A heat engine comprising:
   a high-temperature space portion and a low-temperature space portion, each of which has a working gas with a different temperature range from each other;
   a regenerator provided between the high-temperature space portion and the low-temperature space portion;
   two power pistons configured to cause volumetric changes of the working gases in each of the high-temperature space portion and the low-temperature space portion, and transmit motive energy on receipt of pressure changes of the working gases; and
   a displacer configured to transfer the working gases between the high-temperature space portion and the low-temperature space portion, wherein:
   heat and motive energy are exchanged by using the change in volume of the high-temperature space portion and the change in volume of the low-temperature space portion, the spaces being located respectively on both sides of the regenerator, as well as by using the transfer of the working gases,
   the two power pistons are configured to move relatively to each other, and
   each of the two power pistons has a pressure receiving face placed opposite the regenerator.

2. The heat engine according to claim 1, further comprising a displacer housing portion:
   being installed adjacent to both of the high-temperature and the low-temperature space portions;
   communicating with each of the high-temperature and the low-temperature space portions; and
   housing the displacer therein as allowing the displacer to reciprocate in the housing portion.

3. A heat engine comprising:
   a high-temperature space portion and a low-temperature space portion, each of which has a working gas with a different temperature range from each other;
   a regenerator provided between the high-temperature space portion and the low-temperature space portion;
   two power pistons configured to cause volumetric changes of the working gases in each of the high-temperature space portion and the low-temperature space portion, and transmit motive energy on receipt of pressure changes of the working gases; and
   a displacer configured to transfer the working gases between the high-temperature space portion and the low-temperature space portion,
   wherein heat and motive energy are exchanged by using the change in volume of the high-temperature space portion and the change in volume of the low-temperature space portion, the spaces being located respectively on both sides of the regenerator, as well as by using the transfer of the working gases,
   and wherein the displacer includes two pistons, each of which is configured to move with a phase difference of 180° to each other, and one of the two pistons is placed in the high-temperature space portion and the other of the two pistons is placed in the low-temperature space portion.

4. The heat engine according to claim 3, wherein any one of the two power pistons and any one of the two displacers are integrated into a single unit.

5. The heat engine according to claim 4, wherein the other of the two power pistons and the other of the two displacers are provided so that the power piston and the displacer can be sealed from each other and move relatively to each other.

6. A heat engine comprising:
   a high-temperature space portion and a low-temperature space portion, each of which has a working gas with a different temperature range from each other;
   a regenerator provided between the high-temperature space portion and the low-temperature space portion;
   a power piston configured to cause a volumetric change of the working gas in any one of the high-temperature space portion and in the low-temperature space portion, and transmit motive energy on receipt of a pressure change of the working gas;
   two displacers, each of which has a larger area for receiving pressure than that of the power piston, the two displacers being placed in the respective high-temperature space portion and the low-temperature space portion, and configured to transfer the working gases between the high-temperature space portion and the low-temperature space portion; and
   two pistons respectively provided to the two displacers, each of which is configured to move with a 180° phase difference to each other,
   wherein heat and motive energy are exchanged by using the change in volume of the high-temperature space portion and the change in volume of the low-temperature space portion, one of the spaces being located on one of the sides of the regenerator and the other of the spaces being located on the other of the sides of the regenerator, as well as by using the transfer of the working gases.

7. The heat engine according to claim 1,
   wherein a plurality of heat engine units, each of which includes the displacer and the power piston, are stacked in the arranging direction; and
   the displacer or the power piston between each of the heat engine units located next to each other, is shared by each of the heat engine units located next to each other as an integrated displacer or as an integrated power piston.

8. The heat engine according to claim 6, wherein a plurality of heat engine units, each of which includes the displacer and the power piston, are stacked in the arranging direction; and the displacer or the power piston between each of the heat engine units located next to each other, is shared by each of the heat engine units located next to each other as an integrated displacer or as an integrated power piston.

9. The heat engine according to claim 1, wherein a compressor is connected to at least one of the power piston and the displacer.

10. The heat engine according to claim 6, wherein a compressor is connected to at least one of the power piston and the displacer.

11. The heat engine according to claim 1, wherein at least one of the high-temperature space portion and the low-temperature space portion includes a bellows which is retractable both ways.

12. The heat engine according to claim 6, wherein at least one of the high-temperature space portion and the low-temperature space portion includes a bellows which is retractable both ways.

13. The heat engine according to claim 1, wherein the displacer has piston surfaces facing the high-temperature space portion and the low-temperature space portion, respectively, and moves the working gas between the high-temperature space portion and the low-temperature space portion without causing a pressure difference between the piston surfaces.

* * * * *